(12) United States Patent
Takahashi et al.

(10) Patent No.: US 12,402,637 B2
(45) Date of Patent: Sep. 2, 2025

(54) POULTRY PROCESSING APPARATUS

(71) Applicant: MAYEKAWA MFG. CO., LTD., Tokyo (JP)

(72) Inventors: Noriyuki Takahashi, Tokyo (JP); Koji Takanashi, Tokyo (JP); Sayaka Iwaki, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/696,671

(22) PCT Filed: Jul. 20, 2023

(86) PCT No.: PCT/JP2023/026494
§ 371 (c)(1),
(2) Date: Mar. 28, 2024

(87) PCT Pub. No.: WO2024/029342
PCT Pub. Date: Feb. 8, 2024

(65) Prior Publication Data
US 2024/0389608 A1 Nov. 28, 2024

(30) Foreign Application Priority Data
Aug. 3, 2022 (JP) .................. 2022-123978

(51) Int. Cl.
A22C 21/00 (2006.01)

(52) U.S. Cl.
CPC ...... *A22C 21/0023* (2013.01); *A22C 21/0084* (2013.01)

(58) Field of Classification Search
CPC ............ A22C 21/0023; A22C 21/0084; A22C 21/0053

(Continued)

(56) References Cited

U.S. PATENT DOCUMENTS 4,993,115 A * 2/1991 Hazenbroek ....... A22C 21/0023
452/169
5,188,559 A * 2/1993 Hazenbroek ....... A22C 21/0023
452/167

(Continued)

FOREIGN PATENT DOCUMENTS

JP    H04121142 A    4/1992
JP    H08168334 A    7/1996

(Continued)

OTHER PUBLICATIONS

International Preliminary Report on Patentability issued in Intl. Appln. No. PCT/JP2023/026494, mailed Feb. 13, 2025. English translation provided.

(Continued)

*Primary Examiner* — Richard T Price, Jr.

(74) *Attorney, Agent, or Firm* — ROSSI, KIMMS & McDOWELL LLP

(57) ABSTRACT

In a poultry processing apparatus, a workpiece which is poultry with a body part and a pair of wing parts is conveyed while being supported by a fixing jig. A pair of cutters is disposed respectively on both sides of a conveyance path of the fixing jig. Further, a pair of guide members extends along the conveyance path, and the pair of wing parts of the workpiece supported by the fixing jig is guided from below by the pair of guide members to allow the pair of cutters to access side portions of the body part between the body part and the pair of wing parts.

13 Claims, 7 Drawing Sheets

(58) Field of Classification Search
USPC .......................................................... 452/149
See application file for complete search history.

(56) References Cited

U.S. PATENT DOCUMENTS

| | | | |
|---|---|---|---|
| 6,142,863 A | 11/2000 | Janssen et al. | |
| 9,375,020 B2* | 6/2016 | Peters | ................ A22C 21/0023 |
| 9,706,782 B2 | 7/2017 | Inoue et al. | |
| 2009/0170417 A1* | 7/2009 | Janssen | .............. A22C 21/0053 |
| | | | 452/136 |
| 2012/0208443 A1* | 8/2012 | Hazenbroek | ....... A22C 21/0023 |
| | | | 452/169 |
| 2015/0272140 A1 | 10/2015 | Peters et al. | |

FOREIGN PATENT DOCUMENTS

| | | |
|---|---|---|
| JP | 2001211818 A | 8/2001 |
| JP | 2015533517 A | 11/2015 |
| JP | 6216056 B2 | 10/2017 |

OTHER PUBLICATIONS

English translation of Written Opinion issued in Intl. Appln. No. PCT/JP2023/026494, mailed Aug. 29, 2023, previously cited in an IDS filed Mar. 28, 2024.
International Search Report issued in Intl. Appln. No. PCT/JP2023/026494, mailed Aug. 29, 2023. English translation provided.
Written Opinion issued in Intl. Appln. No. PCT/JP2023/026494, mailed Aug. 29, 2023.

* cited by examiner

POULTRY PROCESSING APPARATUS

TECHNICAL FIELD

The present disclosure relates to a poultry processing apparatus.

BACKGROUND

Generally, in the cut-up processing of cutting up poultry carcasses of fowls such as chickens and separating meat and bone, the carcasses are plucked and bled, and pre-processed by removing guts and other organs (evisceration), followed by cutting and deboning. The cutting and deboning process is being automated using meat processing equipment to improve the work efficiency. In the automated cutting and deboning process, the upper half of a poultry carcass, with legs separated and eviscerated to leave only the upper half of the carcass, is placed and fixed on a substantially conical fixture called a "fixing jig" and conveyed to multiple processing sections one after another in order to perform a series of processes.

One type of the cutting and deboning process includes the step of separating breast meat with wings from a skeletal part, known as "gara". For example, Patent Document 1 discloses an apparatus for making scapula incisions, which is pre-processing for separating meat attached to the scapula bone of a poultry carcass prior to the step of separating breast meat with wings from gara.

CITATION LIST

Patent Literature

Patent Document 1: JP6216056B

SUMMARY

Problems to be Solved

For separating breast meat with wings from gara as described above, pre-processing is performed to ensure proper separation of the two. This type of pre-processing involves not only separating a meat part from a specific part as in Patent Document 1, but also making slits or cuts to prevent a part of the gara from adhering to the breast meat and becoming a foreign substance. For example, triangular bones of poultry, which are generally included in the gara, are relatively brittle and may adhere to the breast meat with wings during separation. The triangular bones adhering to the breast meat with wings may become foreign substances and thus must be removed (trimmed) together with the surrounding meat by workers, which increases the workload and reduces the yield.

To prevent adhering of triangular bones to breast meat, for example, cuts could be made in an appropriate area so that no load is applied to the triangular bones during separation. However, since the triangular bones of poultry are generally located where the wings overlap on the poultry carcass, there is a risk that the cutter will interfere with surrounding parts such as the wings and cut extra parts as well when cutting around the triangular bones.

At least one embodiment of the present disclosure was made in view of the above, and an object thereof is to provide a poultry processing apparatus capable of forming a cut in a predetermined part of a poultry carcass without interference of the cutter with the wings.

Solution to the Problems (1) In order to solve the above-described problems, a poultry processing apparatus according to at least one aspect of the present disclosure includes: a fixing jig capable of conveying a workpiece which is poultry with a body part and a pair of wing parts while supporting the workpiece; a pair of cutters respectively disposed on both sides of a conveyance path of the fixing jig; and a pair of guide members extending along the conveyance path and configured to guide from below the pair of wing parts of the workpiece supported by the fixing jig to allow the pair of cutters to access side portions of the body part between the body part and the pair of wing parts, respectively.

According to the above aspect (1), the workpiece is conveyed along the conveyance path while being supported by the fixing jig, and the pair of wing parts is guided from below by the pair of guide members, respectively. This allows the cutters on each side of the conveyance path to access the side of the body part without interfering with the pair of wing parts guided by the guide members. As a result, cuts can be made in the side of the body part properly without excess parts being cut by the pair of cutters.

(2) In another aspect, in the above aspect (1), the pair of guide members is sloped so as to increase in height while a distance between the guide members increases toward a downstream side of the conveyance path.

According to the above aspect (2), the pair of guide members is configured such that the distance between them increases and their height increases toward the downstream side of the conveyance path. Thus, the pair of wing parts of the workpiece guided from below by the pair of guide members is lifted while being spread laterally relative to the body part, effectively creating a space for the pair of cutters to access the side of the body part.

(3) In another aspect, in the above aspect (2), the pair of guide members has a second section disposed downstream of a first section that includes an upstream end portion of the conveyance path and having a more gradual slope than the first section.

According to the above aspect (3), the second section with a more gradual slope than the first section, which includes the upstream end portion, is provided downstream of the first section of the pair of guide members. This allows the workpiece, with the pair of wing parts lifted relative to the body part in the first section, to be stabilized in the same posture in the second section. Thus, in the second section, the posture of the workpiece is stabilized, and the pair of cutters can access the side of the body part to make cuts precisely.

(4) In another aspect, in the above aspect (3), the pair of guide members has a third section disposed downstream of the second section and sloped so as to decrease in height toward the downstream side of the conveyance path.

According to the above aspect (4), the third section, which is sloped so as to decrease in height toward the downstream side of the conveyance path, is provided downstream of the second section of the pair of guide members. This allows the workpiece, after cuts are made by the cutters, to be carried out smoothly to the downstream process. Further, for example, even if trouble occurs in any conveyance path and the conveyance path needs to be driven in reverse, the workpiece can be smoothly returned to the pair of guide members without getting caught or jammed in the surrounding area.

(5) In another aspect, in any one of the above aspects (1) to (4), the pair of cutters is driven so as to access side portions of the body part at a timing when the workpiece comes to a predetermined position in the conveyance path.

According to the above aspect (5), the pair of cutters is driven synchronously with the workpiece conveyance timing to make cuts in a predetermined position of the workpiece. Thus, cuts can be made precisely in portions in the vicinity of a specific part, such as a triangular bone of poultry, for example.

(6) In another aspect, in the above aspect (5), the apparatus includes a drive source for switching a position of the pair of cutters between a first position allowing the pair of cutters to access side portions of the body part and a second position where the pair of cutters is retracted from the body part.

According to the above aspect (6), the pair of cutters is configured to be driven to switch between the first position and the second position. In the first position, the pair of cutters can cut a predetermined part of the workpiece, while in the second position, the pair of cutters is retracted from the workpiece to prevent excess parts from being cut or interference of the pair of cutters with the surrounding area.

(7) In another aspect, in any one of the above aspects (1) to (6), the pair of cutters has a tooth surface facing upstream in the conveying direction and sloped so as to increase in height toward an inner side.

According to the above aspect (7), the pair of cutters has a tooth surface facing upstream in the conveying direction and sloped so as to increase in height toward the inner side. With the pair of cutters having such tooth surfaces, cuts can be made properly in a specific part of the workpiece conveyed along the conveying direction and guided by the pair of guide members, without interference with the pair of wing parts.

(8) In another aspect, in any one of the above aspects (1) to (7), the fixing jig is capable of tilting with respect to the conveyance path so that the pair of wing parts of the workpiece supported by the fixing jig is placed on the pair of guides.

According to the above aspect (8), the fixing jig that supports the workpiece tilts with respect to the conveyance path, allowing the wing parts of the workpiece to be accurately placed on the pair of guide members. Thus, the pair of wing parts of the workpiece is guided by the pair of guide members, appropriately creating a space between the body part and the wing parts for the pair of cutters to access the side of the body part.

(9) In another aspect, in any one of the above aspects (1) to (8), the pair of cutters is accessible between a triangular bone of the poultry and a meat part inward of the triangular bone.

According to the above aspect (9), cuts can be made by the pair of cutters between the triangular bone of the poultry, which is located on the side of the body part of the workpiece, and the meat part inward of the triangular bone. Making cuts reduces the load on the triangular bone when separating the breast meat from the gara, and can properly prevent the triangular bone from adhering to the breast meat during separation.

Advantageous Effects

At least one embodiment of the present disclosure provides a poultry processing apparatus capable of forming a cut in a predetermined part of a poultry carcass without interference of the cutter with the wing parts.

DETAILED DESCRIPTION

Embodiments will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
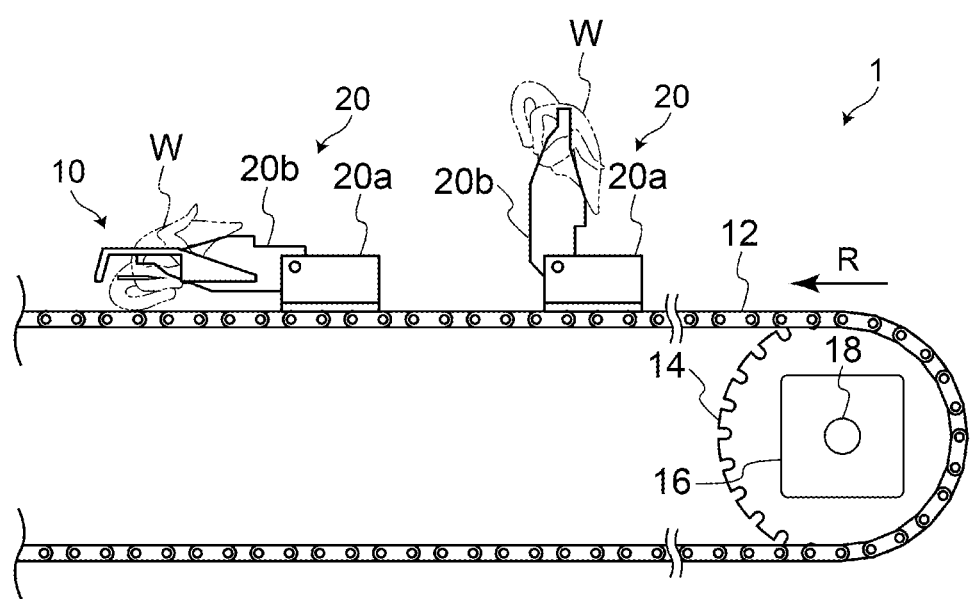
FIG. 1 is an overall schematic diagram of a poultry processing system according to an embodiment.
Figure 2:
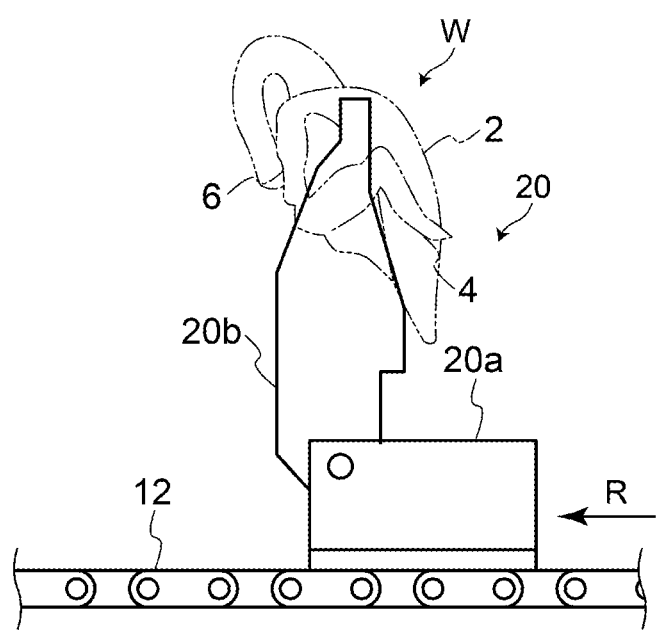
FIG. 2 is an enlarged view of a fixing jig of FIG. 1.

FIG. 1 is an overall schematic diagram of a poultry processing system 1 according to an embodiment. FIG. 2 is an enlarged view of a fixing jig 20 of FIG. 1. The poultry processing system 1 is a system for automating the cut-up processing of separating meat and bone from poultry carcasses of fowls such as chickens as workpieces W. The workpiece W, a poultry carcass, is plucked and bled, and pre-processed by removing guts and other organs (evisceration) to leave a body part 2 and a pair of wing parts 4 (see FIG. 2).

The poultry processing system 1 is equipped with an endless chain conveyor 12 arranged in a substantially horizontal direction. The chain conveyor 12 is wound around a driving sprocket 14 at the beginning. The driving sprocket 14 is driven by a motor 16. In FIG. 1, the chain conveyor 12 moves in the direction along a conveyance path R during the outward journey. The endless chain conveyor 12 is wound around a driven sprocket (not shown) at the end.

The chain conveyor 12 is equipped with a plurality of fixing jigs 20 called "cones" at equal intervals. The fixing jig 20 has a fixed portion 20*a* that is fixed to the chain conveyor 12 and a support portion 20*b* that can support the workpiece W on the fixed portion 20*a*. The chain conveyor 12 forms a conveyance path R for the fixing jig 20, and the fixing jig 20 is conveyed along the conveyance path R.

The workpiece W is placed and fixed on the support portion 20*b* of each fixing jig 20 by a worker at the beginning of the chain conveyor 12. In this embodiment, the workpiece W is placed on the fixing jig 20 with the wing parts 4 facing upstream of the conveyance path R (in other words, a breast part 6 of the body part 2 on the opposite side from the pair of wing parts 4 is facing downstream of the conveyance path R).

In each fixing jig 20, the support portion 20*b* is configured to be tiltable with respect to the fixed portion 20*a*. In FIG.

1, the fixing jig 20 upstream of the poultry processing apparatus 10 in the conveyance path R (right side) has an upright posture in which the support portion 20b stands in a substantially vertical direction with respect to the fixed portion 20a. On the other hand, the fixing jig 20 near the poultry processing apparatus 10 in the conveyance path R (left side) has a tilted posture in which it tilts downstream with respect to the fixed portion 20a. Thus, each fixing jig 20 in the conveyance path R can be switched between the upright posture and the tilted posture. These two postures are switched by a controller (not shown) according to the position of each fixing jig 20 in the conveyance path R. In the conveyance path R, the fixing jig 20 is basically in the upright posture, but in this embodiment, it is temporarily switched to the tilted posture in the range corresponding to the poultry processing apparatus 10, which will be described below, provided at a specific point in the conveyance path.

The position of each fixing jig 20 in the conveyance path R may be managed, for example, by a conveyance distance detecting unit to detect the conveyance distance of the fixing jig 20 from a reference point of the chain conveyor 12. The conveyance distance detecting unit is composed of, for example, an encoder 18 installed in the motor 16 for detecting the cumulative number of revolutions of the motor 16. By measuring the cumulative number of revolutions of the motor 16 with the encoder 18, for example, the amount of movement (conveyance distance) of each fixing jig 20 from the motor position can be detected using the motor position as the reference point.

By managing the position of each fixing jig 20 in the conveyance path R by the conveyance distance detecting unit, the posture of the fixing jig 20 is switched from the upright posture to the tilted posture at the timing when the fixing jig 20 is brought into the poultry processing apparatus 10 from the upstream side in the conveyance path R. Further, the posture of the fixing jig 20 is switched from the tilted posture to the upright posture at the timing when the fixing jig 20 is carried downstream from the poultry processing apparatus 10 in the conveyance path R.

Figure 3:
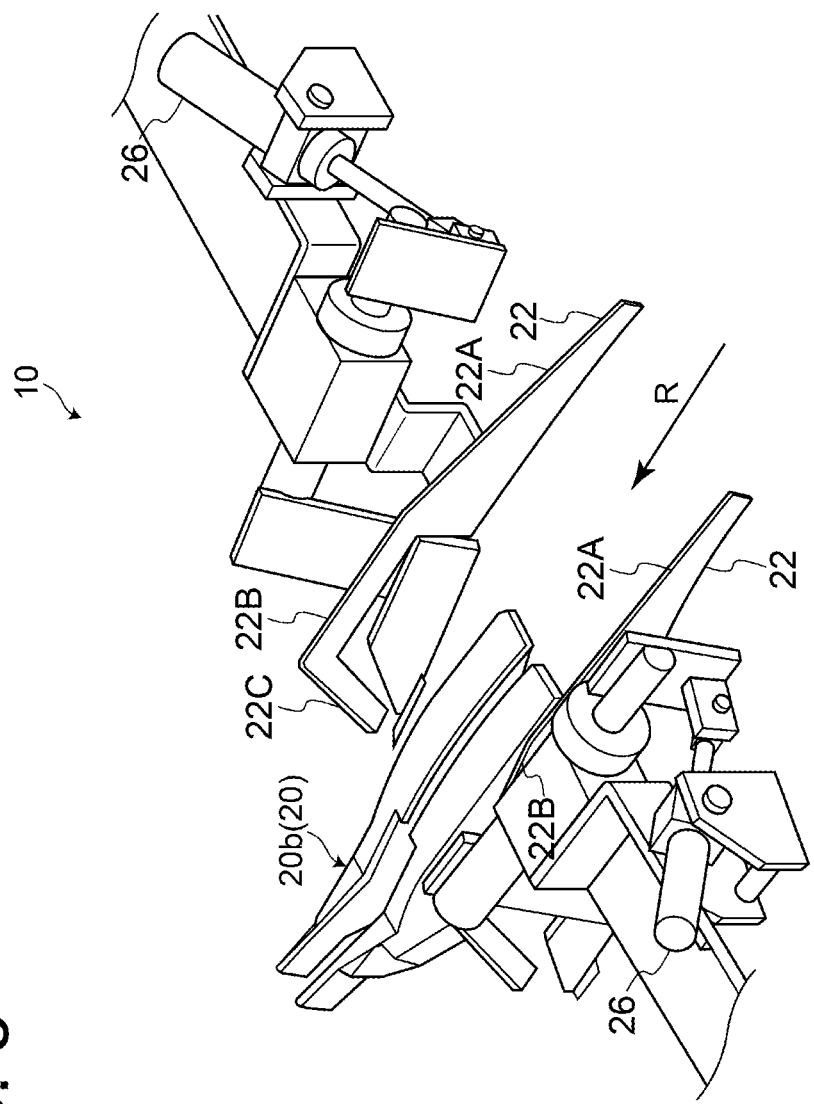
FIG. 3 is a perspective view of a poultry processing apparatus of FIG. 1.
Figure 4:
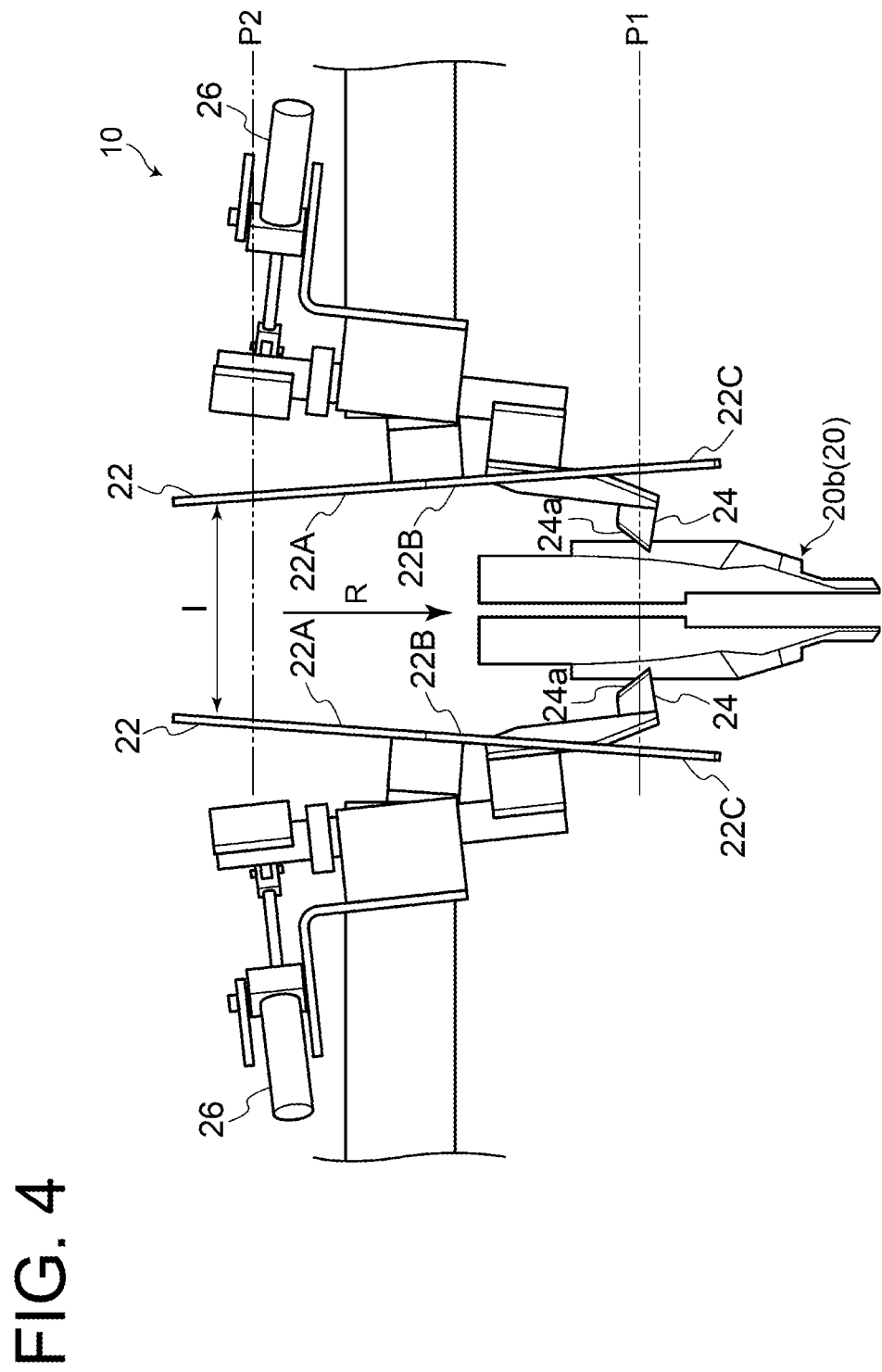
FIG. 4 is a top view of the poultry processing apparatus of FIG. 3 as viewed from above.
Figure 5:
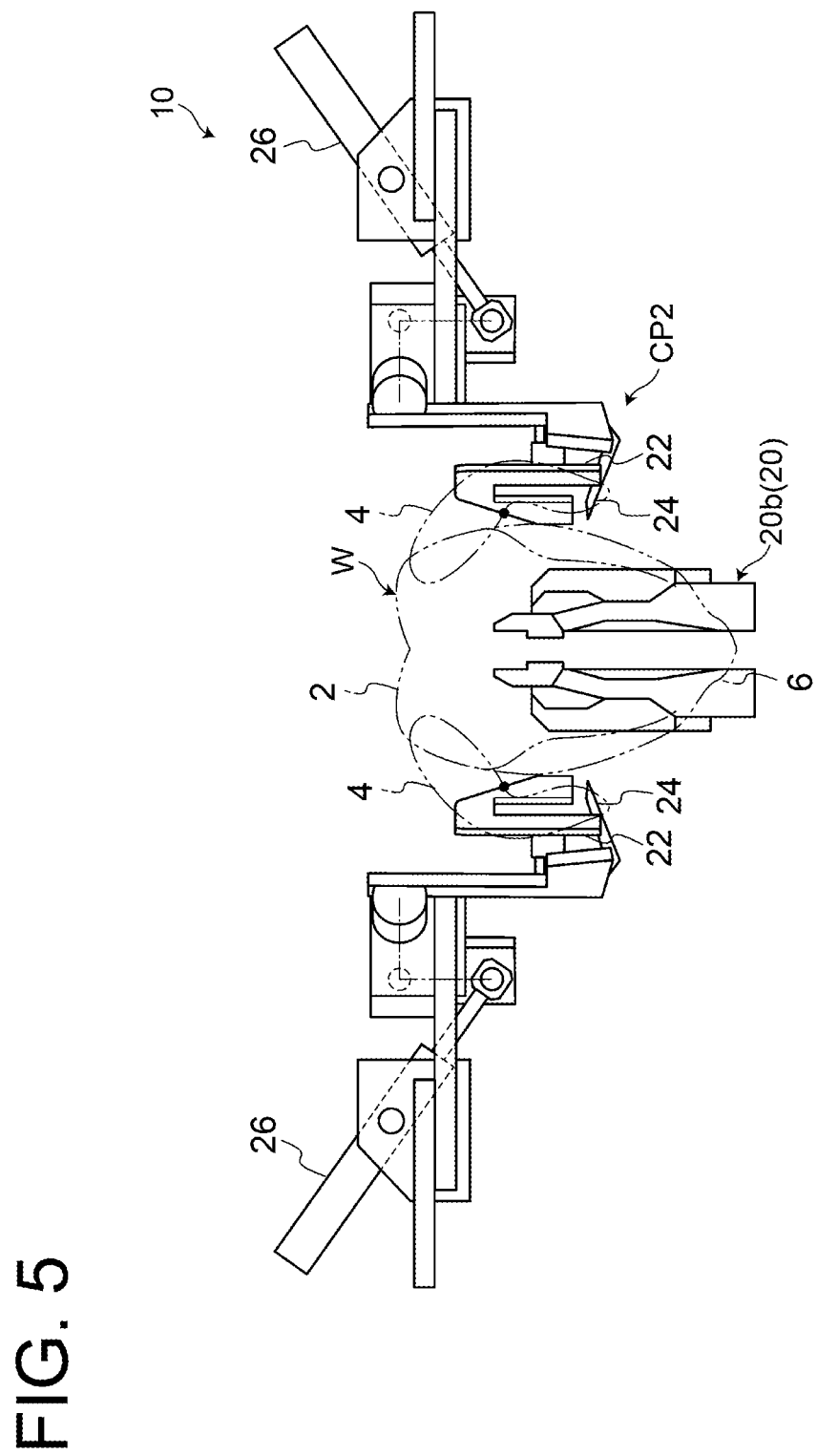
FIG. 5 is a front view of the poultry processing apparatus with a workpiece W when the fixing jig is in position P1 of FIG. 4, as viewed from the downstream side of a conveyance path R.
Figure 6:
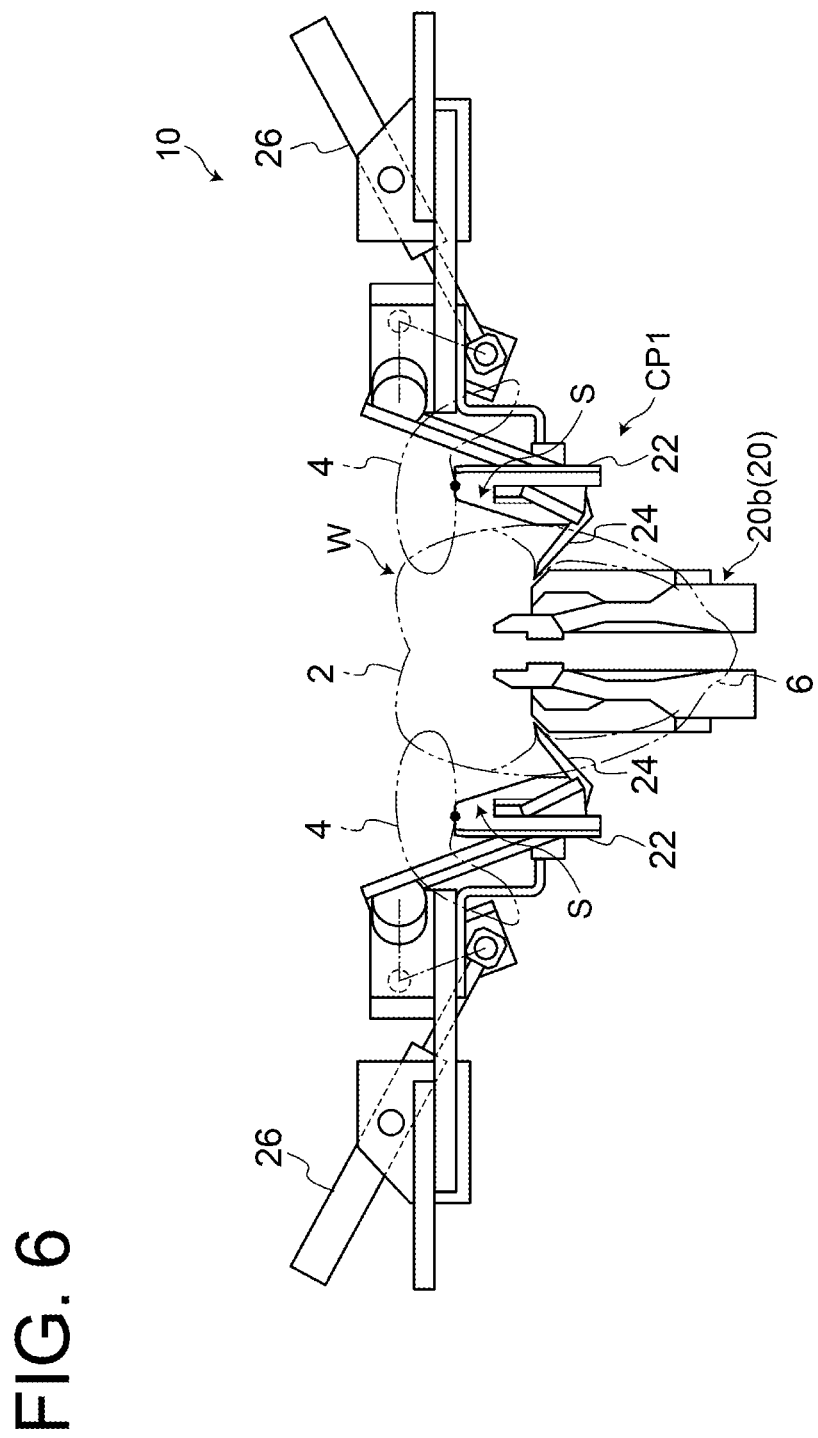
FIG. 6 is a front view of the poultry processing apparatus with a workpiece W when the fixing jig is in position P2 of FIG. 4, as viewed from the downstream side of a conveyance path R.

Next, the poultry processing apparatus 10 incorporated in the poultry processing system 1 having the above configuration will be described. FIG. 3 is a perspective view of the poultry processing apparatus 10 of FIG. 1. FIG. 4 is a top view of the poultry processing apparatus 10 of FIG. 3 as viewed from above. FIG. 5 is a front view of the poultry processing apparatus 10 with the workpiece W when the fixing jig 20 is in position P1 of FIG. 4, as viewed from the downstream side of the conveyance path R. FIG. 6 is a front view of the poultry processing apparatus 10 with the workpiece W when the fixing jig 20 is in position P2 of FIG. 4, as viewed from the downstream side of the conveyance path R.

The poultry processing apparatus 10 is an apparatus provided in a predetermined position of the chain conveyor 12 of the poultry processing system 1 to make cuts in the workpiece W placed and conveyed on the fixing jig 20. The workpiece W brought into the poultry processing apparatus 10 is in a posture with the pair of wing parts 4 facing upward and the breast part 6 facing downward, as the fixing jig 20 is switched to the tilted posture as described above.

The poultry processing apparatus 10 is equipped with a pair of guide members 22 on both sides of the conveyance path R through which the fixing jig 20 can pass. Each of the guide members 22 extends along the conveyance path R. In this embodiment, the guide members 22 are composed of flat plate members, but they may be composed of rod-shaped members, for example.

As described above, the fixing jig 20 is switched from the upright posture to the tilted posture at the timing when it is brought into the poultry processing apparatus 10. As a result, the pair of wing parts 4 of the workpiece W supported by the fixing jig 20 is guided from below by the pair of guide members 22, respectively (in other words, the pair of wing parts 4 of the workpiece W covers over the pair of guide members 22, respectively, and is thereby supported from below).

The pair of guide members 22 is sloped to gradually increase in height from the upstream end toward the downstream side of the conveyance path R. In this embodiment, each of the pair of guide members 22 is configured with a first section 22A, a second section 22B, and a third section 22C, starting from the upstream side of the conveyance path R. The first section 22A, which includes an upstream end portion of the conveyance path R, and the second section 22B, which is disposed downstream of the first section 22A, are sloped so as to gradually increase in height toward the downstream side of the conveyance path R. Thus, the pair of wing parts 4 supported from below by the pair of guide members 22 is lifted upward by the pair of guide members 22 as it proceeds downstream. As a result, a space S is formed between the body part 2 and the pair of wing parts 4 of the workpiece W for access of a pair of cutters 24, which will be described below (see FIG. 6).

The second section 22B disposed downstream of the first section 22A has a more gradual slope than the first section 22A. When the second section 22B with a more gradual slope is disposed downstream of the first section 22A, the workpiece W, with the pair of wing parts 4 lifted relative to the body part in the first section 22A, is stabilized in the same posture in the second section. Thus, in the second section 22B, cuts can be made precisely in the workpiece W in the stabilized posture.

The third section 22C disposed downstream of the second section 22B is sloped so as to decrease in height toward the downstream side of the conveyance path R. In other words, in the third section 22C, the direction of slope is opposite to that of the first section 22A and the second section 22B. This allows the workpiece W, after cuts are made by the poultry processing apparatus 10, to be carried out smoothly to the subsequent process on the downstream side of the conveyance path R.

Further, in the poultry processing system 1, for example, when a problem occurs or inspection becomes necessary in any of the processes, the chain conveyor 12 may be driven in the opposite direction from the normal direction to inspect various parts of the system or to clear the problem such as jamming of the workpiece W. In such a case, the workpiece W that has already been carried out in the past is returned to the poultry processing apparatus 10 from the downstream side of the conveyance path R. In this case, the workpiece W may get caught or jammed by the pair of guide members 22 at the downstream side of the conveyance path R. In this embodiment, by setting the slope of the pair of guide members 22 in the third section 22C as described above so that the height increases from downstream to upstream, when the chain conveyor 12 is driven in reverse, the workpiece W does not get stuck at the downstream end of the pair of guide members 22 and is smoothly returned to the poultry processing apparatus 10.

Further, the pair of guide members 22 is configured such that the distance I between the guide members 22 widens toward the downstream side of the conveyance path R. Thus, in the first section 22A and the second section 22B where the height of the pair of guide members 22 increases toward the downstream side, the pair of wing parts 4 of the workpiece W guided from below by the pair of guide members 22 is lifted while being spread laterally, effectively extending the space S between the body part 2 and the wing parts 4.

The poultry processing apparatus 10 is equipped with a pair of cutters 24 one on each side of the conveyance path R. The pair of cutters 24 has a tooth surface 24a facing the conveying direction of the conveyance path R and sloped so as to increase in height toward the inner side. Thus, the wing parts 4 of the workpiece W conveyed along the conveyance path R are supported from below by the pair of guide members 22, and the pair of cutters 24 can make cuts in the side of the body part 2 through the space S formed between the body part 2 and the wing parts 4.

The position of the pair of cutters 24 in the conveyance path R is set corresponding to the position of cuts to be made in the workpiece W supported by the fixing jig 20. In this embodiment, the pair of cutters 24 is provided in a position corresponding to the second section 22B of the pair of guide members 22. As described above, the second section 22B is relatively less sloped, so the posture of the workpiece W is stable. Therefore, by providing the pair of cutters 24 in the position corresponding to the second section 22B, cuts can be made in the workpiece W precisely.

Further, the pair of cutters 24 may be moved to make cuts in the side of the body part 2 of the workpiece W at the timing when the workpiece W comes to a predetermined position along the conveyance path R. In this case, the poultry processing apparatus 10 is equipped with a drive unit for driving the pair of cutters 24. In this embodiment, the drive unit includes a pair of air cylinders 26 disposed outward of the pair of guide members 22, respectively. The driving force from the pair of air cylinders 26 is transmitted to the pair of cutters 24 via a predetermined link mechanism.

The pair of cutters 24 can switch between the first position CP1 and the second position CP2 by rotating around an axis along the conveyance path R by driving force from the pair of air cylinders 26. The first position CP1 is the position where the pair of cutters 24 can cut into the side of the body part 2 of the workpiece W to make cuts, as shown in FIG. 6. On the other hand, the second position P2 is the position where the pair of cutters 24 is retracted outward from the body part 2, as shown in FIG. 5. The switching operation between the first position CP1 and the second position CP2 is synchronized with the conveyance timing of the workpiece W to the poultry processing apparatus 10 so that cuts are made in a predetermined position of the workpiece W. At the timing when no cut is made, the pair of cutters 24 retreats to the second position CP2 to avoid interference with the surrounding extra parts.

Figure 7:
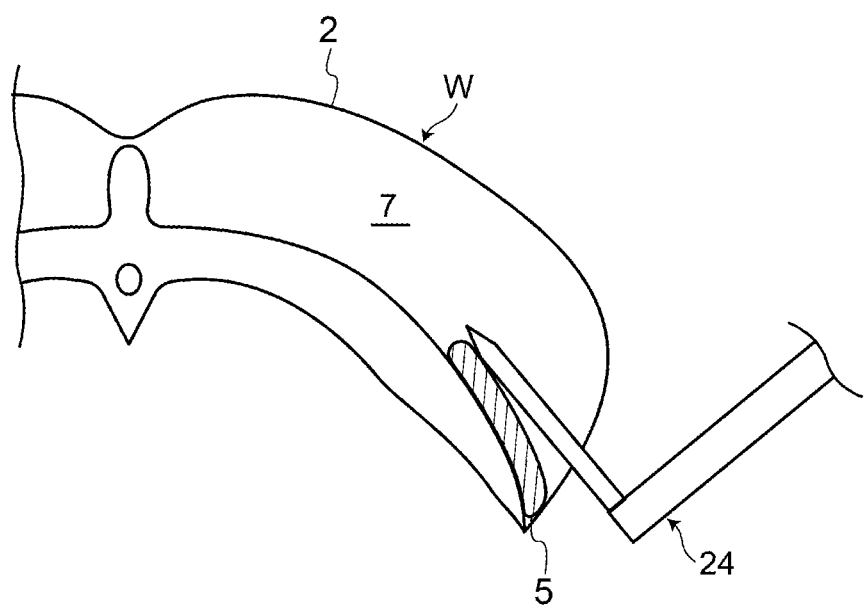
FIG. 7 is a schematic cross-sectional view of the workpiece when a cut is made by the cutter.

FIG. 7 is a schematic cross-sectional view of the workpiece W when a cut is made by the cutter 24. FIG. 7 shows the cross-sectional structure of the workpiece W viewed from the conveying direction, with the triangular bone 5 located on the side of the body part 2. The position of the pair of cutters 24 is adjusted for such a workpiece W to access between the triangular bone 5 and the meat part 7 adjacent to the triangular bone 5. Thus, in the poultry processing apparatus 10, cuts are made between the triangular bone 5 and the meat part 7 by the pair of cutters 24. As a result, the load on the triangular bone 5 is reduced when gara and breast meat are separated on the downstream side of the poultry processing apparatus 10, effectively preventing the triangular bone 5 from adhering to the breast meat from the gara.

As described above, according to the aforementioned embodiment, the workpiece W is conveyed along the conveyance path R while being supported by the fixing jig 20, and the pair of wing parts 4 is guided from below by the pair of guide members 22, respectively. This allows the cutters on each side of the conveyance path R to access the side of the body part 2 without interfering with the pair of wing parts 4 guided by the guide members 22. As a result, cuts can be made in the side of the body part 2 properly without excess parts being cut by the pair of cutters 24.

REFERENCE SIGNS LIST

1 Poultry processing system
2 Body part
4 Wing part
5 Triangular bone
6 Breast part
7 Meat part
10 Poultry processing apparatus
12 Chain conveyor
14 Driving sprocket
16 Motor
18 Encoder
20 Fixing jig
20a Fixed portion
20b Support portion
22 Guide member
22A First section
22B Second section
22C Third section
24 Cutter
24a Tooth surface
26 Air cylinder
R Conveyance path
S Space
W Workpiece

The invention claimed is:

1. A poultry processing apparatus, comprising:
a fixing jig configured to convey a workpiece which is poultry with a body part and a pair of wing parts while supporting the workpiece;
a pair of cutters respectively disposed on both sides of a conveyance path of the fixing jig; and
a pair of guide members extending along the conveyance path and configured to guide from below the pair of wing parts of the workpiece supported by the fixing jig to form a pair of spaces, between the body part and the pair of wing parts, for receiving the pair of cutters, respectively, the pair of cutters being configured to access, via the pair of spaces, and cut side portions of the body part.

2. The poultry processing apparatus according to claim 1, wherein the pair of guide members is sloped so as to increase in height while a distance between the guide members increases toward a downstream side of the conveyance path.

3. The poultry processing apparatus according to claim 2, wherein the pair of guide members has a second section disposed downstream of a first section that includes an upstream end portion of the conveyance path and having a more gradual slope than the first section.

4. The poultry processing apparatus according to claim 3, wherein the pair of guide members has a third section disposed downstream of the second section and sloped so as to decrease in height toward the downstream side of the conveyance path.

5. The poultry processing apparatus according to claim 1, wherein the pair of cutters is driven so as to access side portions of the body part at a timing when the workpiece comes to a predetermined position in the conveyance path.

6. The poultry processing apparatus according to claim 5, further comprising a drive source for switching a position of the pair of cutters between a first position allowing the pair of cutters to access side portions of the body part and a second position where the pair of cutters is retracted from the body part.

7. The poultry processing apparatus according to claim 1, wherein the pair of cutters has a tooth surface facing upstream in the conveying direction and sloped so as to increase in height toward an inner side.

8. The poultry processing apparatus according to claim 1, wherein the fixing jig is configured to tilt with respect to the conveyance path so that the pair of wing parts of the workpiece supported by the fixing jig is placed on the pair of guides.

9. The poultry processing apparatus according to claim 1, wherein the pair of cutters access the body part between a triangular bone of the poultry and a meat part inward of the triangular bone.

10. The poultry processing apparatus according to claim 1, wherein the fixing jig is configured to support the workpiece in a posture with the pair of wind parts facing upward and a breast part of the workpiece facing downward, while the pair of guide members guides from below the pair of wing parts of the workpiece.

11. The poultry processing apparatus according to claim 1, wherein the pair of cutters are configured to cut the side portions of the body part without cutting the pair of wings.

12. A poultry processing apparatus, comprising:
a fixing jig configured to convey a workpiece which is poultry with a body part and a pair of wing parts while supporting the workpiece;
a pair of cutters respectively disposed on both sides of a conveyance path of the fixing jig;
a drive source; and
a pair of guide members extending along the conveyance path and configured to guide from below the pair of wing parts of the workpiece supported by the fixing jig to allow the pair of cutters to access side portions of the body part between the body part and the pair of wing parts, respectively,
wherein the pair of cutters is driven so as to access side portions of the body part at a timing when the workpiece comes to a predetermined position in the conveyance path, and
wherein the drive source is configured to switch a position of the pair of cutters between a first position allowing the pair of cutters to access side portions of the body part and a second position where the pair of cutters is retracted from the body part.

13. A poultry processing apparatus, comprising:
a fixing jig configured to convey a workpiece which is poultry with a body part and a pair of wing parts while supporting the workpiece;
a pair of cutters respectively disposed on both sides of a conveyance path of the fixing jig; and
a pair of guide members extending along the conveyance path and configured to guide from below the pair of wing parts of the workpiece supported by the fixing jig to allow the pair of cutters to access side portions of the body part between the body part and the pair of wing parts, respectively,
wherein the fixing jig is configured to tilt with respect to the conveyance path so that the pair of wing parts of the workpiece supported by the fixing jig is placed on the pair of guides.

* * * * *